US012756195B2

(12) United States Patent
Singh et al.

(10) Patent No.: US 12,756,195 B2
(45) Date of Patent: Oct. 6, 2026

(54) MICROGRID NETWORK CHARACTERIZATION

(71) Applicant: Caterpillar Inc., Peoria, IL (US)

(72) Inventors: Ranjay Singh, Bangalore (IN); Manoj Kumar Bantupalli, Bangalore (IN); Srideep Chatterjee, Bhopal (IN); Ayush Sharan, Bengaluru (IN)

(73) Assignee: Caterpillar Inc., Peoria, IL (US)

( * ) Notice: Subject to any disclaimer, the term of this patent is extended or adjusted under 35 U.S.C. 154(b) by 366 days.

(21) Appl. No.: 18/612,887

(22) Filed: Mar. 21, 2024

(65) Prior Publication Data

US 2025/0300461 A1 Sep. 25, 2025

(51) Int. Cl.

| | |
|---|---|
| ***H02J 3/18*** | (2026.01) |
| ***H02J 3/38*** | (2026.01) |
| ***H02J 103/30*** | (2026.01) |
| ***H02J 103/35*** | (2026.01) |

(52) U.S. Cl.

CPC ................ *H02J 3/18* (2013.01); *H02J 3/381* (2013.01); *H02J 2103/30* (2026.01); *H02J 2103/35* (2026.01)

(58) Field of Classification Search

None

See application file for complete search history.

(56) References Cited

U.S. PATENT DOCUMENTS

| | | | | |
|---|---|---|---|---|
| 9,625,928 | B2 | 4/2017 | Hajimiragha | |
| 9,847,648 | B2 | 12/2017 | Shelton | |
| 2010/0179704 | A1 | 7/2010 | Ozog | |
| 2021/0175709 | A1 | 6/2021 | Martinez et al. | |
| 2022/0121260 | A1 | 4/2022 | King et al. | |
| 2022/0385075 | A1* | 12/2022 | Martinez | H02J 3/381 |
| 2024/0088668 | A1* | 3/2024 | Chatterjee | H02J 3/381 |

FOREIGN PATENT DOCUMENTS

| | | | |
|---|---|---|---|
| CN | 102420426 | A | 4/2012 |
| CN | 102856899 | A | 1/2013 |
| CN | 103490428 | A | 1/2014 |
| CN | 113193544 | A | 7/2021 |
| CN | 114678854 | A | 6/2022 |
| KR | 20200004705 | A | 1/2020 |

OTHER PUBLICATIONS

Written Opinion and International Search Report for Int'l. Patent Appln. No. PCT/US2025/016214, mailed Jun. 3, 2025 (14 pgs).

* cited by examiner

*Primary Examiner* — Ryan A Jarrett

(57) ABSTRACT

An microgrid with a microgrid controller characterizes individual power generating assets of the microgrid by determining the level of expected parasitic losses in the delivery of power from the assets to loads that are being powered by the microgrid. The controller may command changes in the power delivery from a particular asset and then observe how a swing machine responds to those changes. By comparing the change in power delivery from the asset to the compensatory change in power delivered by the swing machine, the controller characterizes the expected parasitic losses in the delivery of power from the asset. The controller may generate and/or update a parasitic loss model for the asset and subsequently use that parasitic loss model to dispatch power from that asset in the future, such that the power dispatched takes into account the expected parasitic losses in the delivery of the power.

20 Claims, 6 Drawing Sheets

MICROGRID NETWORK CHARACTERIZATION

TECHNICAL FIELD

The present disclosure relates to controlling dispatch of power on a microgrid based on characterization of the microgrid. More specifically, the present disclosure relates characterizing the microgrid network between a generation asset and a load.

BACKGROUND

Microgrids are useful in deploying power infrastructure in a location that may not otherwise have electrical power infrastructure. In other words, a microgrid is a locally deployed power grid that interconnects one or more generation assets with one or more loads (e.g., entities to which power is provided). In some cases, the microgrid may be an island, operating in isolation. In other cases, the microgrid may be connected to another grid, such as a larger power grid tie-in. In cases where the microgrid is tied to a larger grid, the grid tie-in may act as a semi-infinite source of power and may be referred to as a swing machine. In the case where the microgrid is islanded, one of the generating assets may serve as a semi-infinite source of power or as a swing machine.

In microgrids, often times the delivery network may not be fully characterized. For example, the parasitic losses due to resistive and/or reactive characteristics of powerlines may not be known or may require prior study and/or characterization. Additionally, changes in parasitic losses over time may not be known. As a result, it is not efficient to dispatch power from a particular asset (e.g., generation/power source) to a load drawing power on the microgrid. In particular, the resistive and/or reactive losses from the asset to the load may not be known, since the resistive, inductive, and/or capacitive components of the powerlines are not known. Measuring the line resistances and/or reactances may be time consuming, laborious, and/or expensive. However, knowing the parasitics of the microgrid is useful for efficiently dispatching power from various assets of the microgrid.

One mechanism for operating a microgrid network is described in U.S. Pat. No. 9,847,648 (hereinafter referred to as "the '648 patent"). The '648 patent describes a mechanism by which dispatching power from power sources on a power grid may be controlled responsive to changes in the output of one or more other power sources of the microgrid. The '648 patent describes procedures to prevent brownouts and other power delivery issues when one or more sources of power are not generating to expected capacity. However, the systems and methods described in the '648 patent does not pertain to characterizing the power network to optimally and/or accurately dispatch power from generation sources turned on responsive to reduced power output from other sources or to add or shed load(s) on a microgrid. Thus, the disclosure of the '648 patent does not describe how to operate a grid or a microgrid to dispatch power in a manner that compensates for microgrid-level losses.

Examples of the present disclosure are directed toward overcoming one or more of the deficiencies noted above.

SUMMARY

In an aspect of the present disclosure, a microgrid may include one or more generating asset, including a first generating asset, a swing machine, one or more loads, a controller, and one or more computer-readable media storing computer-executable instructions that are executed by the controller. When the computer-executable instructions are executed by the controller, the controller will send a first command to the first generating asset to implement a first power output change from the first generating asset and determine a second power output change from the swing machine, wherein the second power output change is responsive to the first power output change. The controller will further compare the first power output change to the second power output change to identify parasitic losses in delivering power from the first generating asset to the one or more loads and send a second command, to the first generating asset, to dispatch power from the first generating asset based at least in part on the parasitic losses in delivering power from the first generating asset to the one or more loads.

In another aspect of the present disclosure, a method includes sending, by a controller comprising one or more processors, a first command to a first generating asset to implement a first power output change from the first generating asset and receiving, by the controller, an indication of a second power output change from a swing machine, wherein the second power output change is responsive to the first power output change. The method further includes comparing, by the controller, the first power output change to the second power output change to identify parasitic losses in delivering power from the first generating asset to one or more loads and generating, by the controller and based at least in part on the parasitic losses in delivering power from the first generating asset to the one or more loads, a parasitic loss model of the first generating asset.

In yet another aspect of the present disclosure, a microgrid controller, includes one or more processors and one or more computer-readable media storing computer-executable instructions that, when executed by the one or more processors, cause the one or more processors to receive, from a sensor, an indication in a first change in power delivered from a swing machine to one or more loads of a microgrid, wherein the first change in power is responsive to a second change in power from a first generating asset. The one or more processors further determine, based at least in part on the first change in power and the second change in power, an estimate of parasitic losses associated with delivering power from the first generating asset to one or more loads and send, based at least in part on the estimate of the parasitic losses associated with delivering power from the first generating asset to the one or more loads, a command to the first generating asset to provide power the one or more loads.

DETAILED DESCRIPTION

Wherever possible, the same reference numbers will be used throughout the drawings to refer to the same or like parts.

Figure 1:
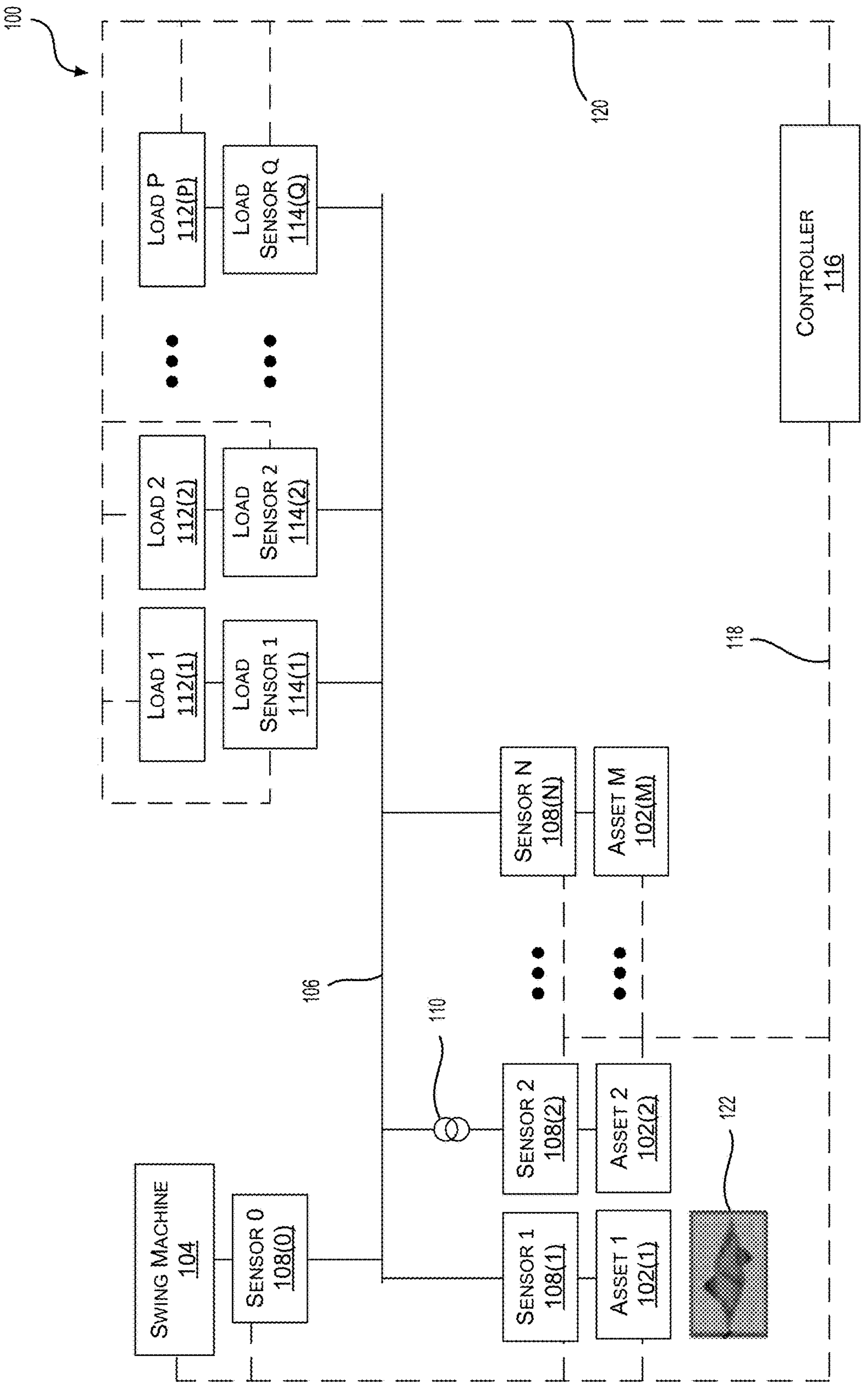
FIG. 1 is a block diagram of an example microgrid with one or more power generating assets and a swing machine, according to examples of the disclosure.

FIG. 1 is a block diagram of an example microgrid 100 with one or more power generating assets 102(1), 102(2), . . . 102(M) and a swing machine 104, in accordance with examples of the disclosure. The generating assets, or assets 102(1), 102(2), . . . 102(M), hereinafter referred to in the singular as asset 102 or in the plural as assets 102, may be any suitable generation source. For example, the assets 102 may be solar panels, microturbines, fuel cells, geothermal generators, solar concentrators, diesel generators, gasoline generators, natural gas generators, coal generators, battery storage, supercapacitors, combinations thereof, or the like.

The swing machine 104 may be a semi-infinite source of power to the microgrid 100. Thus, the swing machine 104 may be able to provide power to the microgrid 100 if the assets 102 of the microgrid 100 are not producing all the power needed. In some cases, the swing machine 104 may be a semi-infinite source of power from the perspective of the microgrid 100. In some examples of the disclosure, the swing machine 104 may be a grid-tie to a different and/or larger grid than the microgrid 100. For example, the swing machine 104 may represent a grid-tie to a macrogrid, such as a utility-scale power grid. The swing machine 104 serves to provide instantaneous or near instantaneous power to the microgrid 100 to compensate for any power needs of the microgrid 100 that is not being provided by the assets 102.

The assets 102 and the swing machine 104 provide power to powerlines 106. Although illustrated as just a single line, it should be understood that the powerlines 106 may include any suitable number of lines, such as two lines, four lines, six lines, or the like. The powerlines 106 may be substantially similar to powerlines used in macrogrids for delivering power from a power utility. For example, the powerlines 106 may be formed of aluminum, iron, copper, other conductors, or the like. In some cases, the powerlines 106 may be seethed/covered, and in other cases, the powerlines 106 may not be seethed/covered. It should further be understood that the powerlines 106 may be overhead powerlines, terrestrial powerlines, and/or underground powerlines. The powerlines 106 may also be referred to, but not limited to, as transmission lines, power cables, transmission wires, electric cables, electric lines, high-voltage lines, low voltage lines, combinations thereof, or the like.

The microgrid 100 may also include sensors 108(0), 108(1), 108(2), . . . 108(N), hereinafter referred to in the singular as sensor 108 or in the plurality as sensors 108. In some cases, the sensors 108 may correspond to a respective power source (e.g., swing machine 104 and/or assets 102). In other cases, some, but not all of the power sources may have a respective sensor 108. In some cases, the sensors 108 may be separate entities (e.g., with their own housing and/or independent electrical connections), as depicted. In other cases, the sensors 108 may be incorporated within their respective power source (e.g., swing machine 104 and/or assets 102). The sensors 108 may be any suitable sensor(s), such as ammeters, voltmeters, power meters, and/or the like. The sensors 108 may be configured to provide a measure of current, voltage, and/or power of the sensors' 108 corresponding power source 102, 104. In some cases, instead of, or in addition to, the sensors 108, the assets 102 may have dedicated asset-level controllers that provide the data associated with the voltage, current, and/or power output of the assets 102. Regardless of the exact nature of the entities providing output metrics of the assets 102, the disclosure herein makes use of those asset-level metrics. It will be understood that any acts attributable to sensors 108 may alternatively be performed by asset-level controllers.

The assets 102, in some cases, may be coupled to the powerlines 106 via one or more components 110. The components 110 may be any suitable coupling element to the powerlines 106. The components 110 may include, for example, transformers, inductors, capacitors, phase-lock-loop circuits, any variety of control circuitry, and/or any variety of measurement circuitry.

The microgrid 100 may include one or more loads 112(1), 112(2), . . . 112(P), hereinafter referred to in the singular as load 112 or in the plural as loads 112, electrically coupled to the powerlines 106. The loads 112 represent elements that are to be powered on the microgrid 100. In other words, the loads 112 consume the power delivered to the powerlines 106 from the assets 102 and/or swing machine 104. The loads may be any suitable electrical element, such as household appliances, heating/cooling equipment, industrial tools and machines, factories, construction site equipment and machines, mining site equipment and machines, farming equipment and machines, combinations thereof, or the like.

The microgrid 100 may also include load sensors 114(1), 114(2), . . . 114(Q), hereinafter referred to in the singular as load sensor 114 or in the plurality as load sensors 114. In some cases, the load sensors 114 may correspond to a respective load 112. In other cases, some, but not all of the loads 112 may have a respective load sensor 114. In some cases, the load sensors 114 may be separate entities (e.g., with their own housing and/or independent electrical connections), as depicted. In other cases, the load sensors 114 may be incorporated within their respective load 112. The load sensors 114 may be any suitable sensor(s), such as ammeters, voltmeters, power meters, and/or the like. The load sensors 114 may be configured to provide a measure of current, voltage, and/or power of the corresponding load 112.

The microgrid 100 further includes a controller 116 that controls the operation of the assets 102, and optionally the swing machine 104 and/or the loads 112. The controller 116 may be able to further communicate with the sensors 108 and/or the load sensors 114 to obtain current, voltage, power measurements, health, and/or online status associated with their respective power sources and/or loads 112. Thus, the controller 116 may be configured to obtain data, from sensor 108(0) (or an asset-level controller), that indicates and/or can be used to determine the current, voltage, and/or power delivered by the swing machine 104 to the powerlines 106 of the microgrid 100. Similarly, the controller 116 may be configured to obtain data, from sensor 108(1) (or an asset-level controller), that indicates and/or can be used to determine the current, voltage, and/or power delivered by the asset 102(1) to the powerlines 106 of the microgrid 100.

Optionally, the controller 116 may be configured to communicate with the loads 112 and/or the load sensors 114. For example, the controller 116 may optionally be able to obtain, from load sensor 114(1), the current, voltage, and/or power consumed by load 112(1). Similarly, the controller 116 may optionally be able to obtain, from load sensor 114(2), the current, voltage, and/or power consumed by load 112(2).

Similar to the assets 102, the loads may also have load-level controllers instead of, or in addition to, the load sensors 114.

The controller 116 may be configured to communicate with the swing machine 104, the sensors 108, and/or the assets 102 via control plane 118. Similarly, but optionally, the controller 116 may be configured to communicate with the loads 112, and/or the load sensors 114 via control plane 120. In other words, examples of the disclosure may be performed without the control of a load 112 or its load sensors 114, while other examples may require the ability of the controller 116 to communicate with the load sensors 114 and/or the loads 112. While the control plane 118 and/or control plane 120 are depicted as dotted lines, it should be understood that the control plane 118, 120 may be any wired or wireless communications mechanism that allows the controller 116 to issue commands and/or receive data or status from one or more of the assets 102, swing machine 104, sensors 108, loads 112, and/or load sensors 114. The control planes 118, 120 may use any suitable communications protocols and/or mechanisms.

In examples of the disclosure, the controller 116 may be configured to characterize the microgrid 100 with respect to each asset 102 by changing one or more operations of the asset 102 and observe the behavior of the swing machine 104 responsive to the change in the one or more operations of the asset 102. If an instantaneous change in the dispatch of power from an asset 102 is commanded by the controller 116, assuming that the power needs of the loads 112 have not changed at that instance, then the swing machine 104 will compensate for the change in the overall delivery of power ($\Delta P_1$) to the loads 112 from the asset 102. According to examples of the disclosure, the controller 116 may obtain the change in the current, voltage, and/or power delivered to the loads 112 from the swing machine 104, such as by communicating with sensor 108(0). This change in the power delivered ($\Delta P_2$) by the swing machine 104 may be used to determine the parasitic losses in the delivery of power from the asset 102 being characterized.

The controller 116 may use the comparison of the change in power of the asset being tested ($\Delta P_1$) and the change in power of the swing machine 104 ($\Delta P_2$) to determine the parasitic losses from the asset 102 to the loads 112. For example, if $\Delta P_2 = \Delta P_1$, then it may be understood that the parasitic losses from the asset 102 to the loads 112 via the powerlines 106 is the same as the parasitic losses from the swing machine 104 to the loads 112 via the powerlines 106. In this way, the controller 116 may command different levels of power dispatch changes to the asset 102 being tested and the corresponding levels of change in power provided by the swing machine 104 ($\Delta P_2$) may be recorded. In this way, the controller 116 generate a model 122 of the parasitic losses from the asset 102 to the loads 112 relative to the parasitic losses from the swing machine 104 to the loads 112. This model 122 of the parasitic losses from the asset 102 to the loads 112 may be used by the controller 116 to dispatch power demanded by the microgrid 100 from that asset 102.

The above described procedure used to characterize one of the assets 102 can be repeated on other of the assets 102, such as all of the assets 102, of the microgrid 100. Thus, a respective parasitic loss model 122 may be generated for each asset 102. At this point, if there is a need to supply additional power to the powerlines 106, then an asset 102 may be commanded to provide the additional power to the microgrid 100 along with estimated losses in the transmission of the additional power. In this way, the controller 116 can command a precise change in output of power from a particular asset 102, which compensates for the loss of power in transmission to the loads 112, based at least in part on the parasitic loss model 122 of that asset 102. Thus, the controller 116 may characterize the parasitic losses of each of the assets 102 of the microgrid 100 and use that characterization to dispatch a precise and accurate amount of power that provides the power needed by the loads 112, as well as the losses in transmission of the power. The controller 116 is further able to utilize assets 102 in a manner to compensate and/or optimize for transmission losses. For example, the controller 116 may preferentially dispatch power from assets 102 that result in lower transmission losses to benefit from reduced fuel usage and/or cost.

In should be understood that the controller 116 may characterize the assets 102 with respect to active power, reactive power, and/or apparent power. The controller 116 may generate a model of parasitic losses 122 for each asset 102 for individual ones of active power, reactive power, and/or apparent power. For example, the controller 116 may characterize a particular asset 102 with respect to both active power and reactive power. Thus, the controller 116 may generate an active power model of parasitic losses 122 and a reactive power model of parasitic losses 122. Advantageously, the microgrid-level characterization may be performed while the microgrid 100 is live and operational, resulting in reduced and/or no downtime of the microgrid 100 for the purposes of characterization.

The controller 116 may periodically recharacterize each of the assets 102, as the parasitic losses from a particular asset 102 may change over time, as the characteristics of the loads 112 change over time within the microgrid 100. The recharacterization may be performed with any suitable frequency, such as every 10 seconds, every minute, every hour, one or more week(s), one or more month(s), every year, or any other suitable period of recharacterization.

In some cases, the controller 116 may further determine the parasitic parameters, such as impedance, resistance, reactance, s-parameters, z-parameters, etc., of the delivery of power from an asset 102 to the microgrid 100. The controller 116 may determine the parasitic parameters based at least in part on the power model(s) 122 of the asset 102. In some cases, the parasitic parameters of the swing machine 104 may be known and used, by the controller 116, to determine the parasitic parameters of the asset 102. In this way, the parasitic parameters of interest may be determined and/or displayed by the controller 116.

It should be understood that the microgrid 100, as disclosed herein, enables very accurate and/or precise dispatch of power from assets 102, which take into account losses in the delivery of the power needed by the microgrid 100. This enables reduced thermal losses in the delivery of power to the loads 112 and robust control of the assets 102 of the microgrid 100. The reduced mismatches in power requirements and supply of power may lead to reduced voltage lags and/or voltage surges, as well as greater coherence of frequency and phase of power delivery on the microgrid 100. The systems and methods disclosed herein also reduce the stresses on the swing machine 104 and provide efficient and/or optimal dispatch of power from the assets 102. Cost savings may also be realized from eschewing grid-tied utility scale power from the swing machine 104 in favor of efficiently deploying asset(s) 102 of the microgrid 100.

Figure 2:
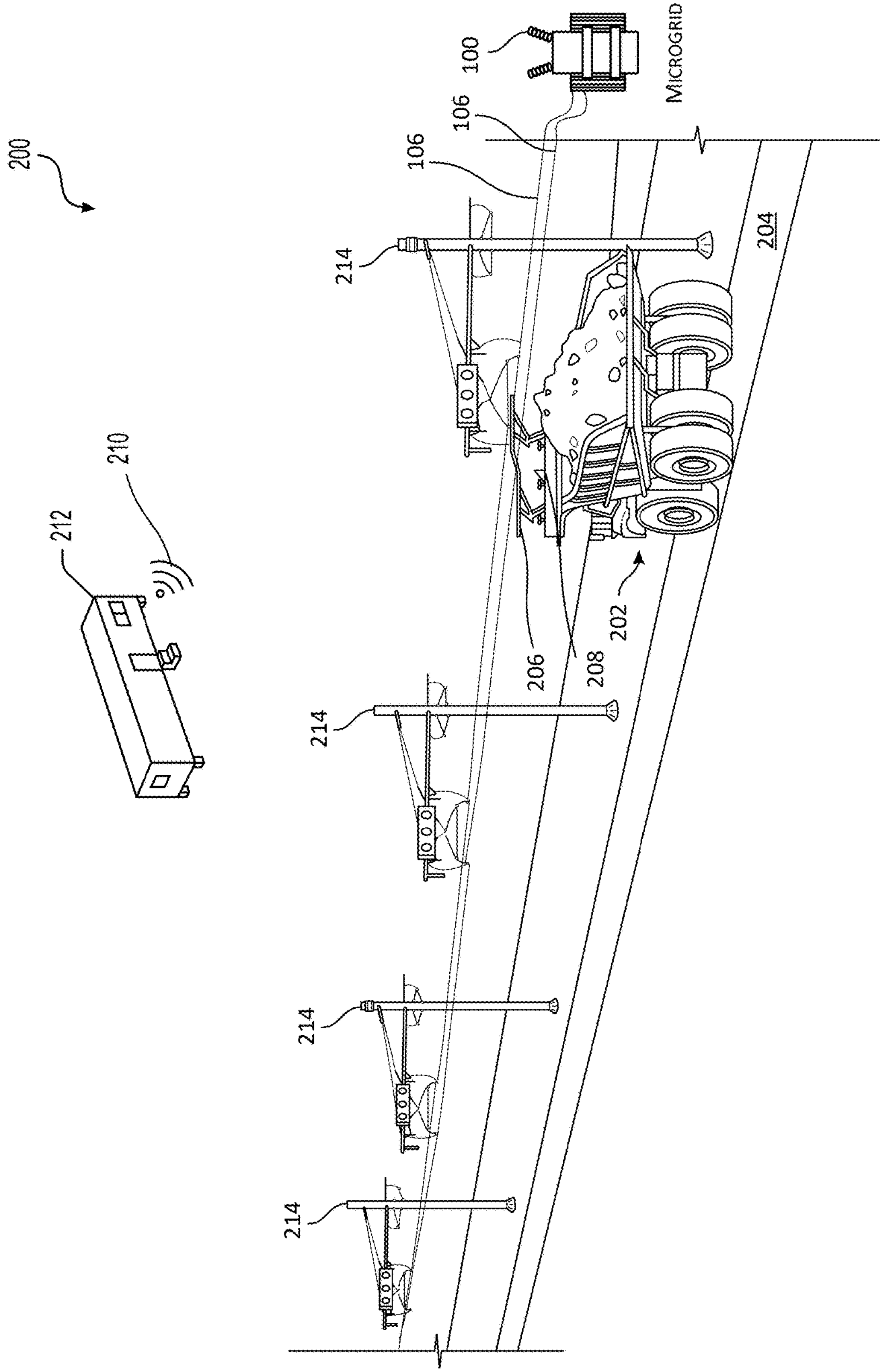
FIG. 2 is a schematic illustration of an example microgrid deployed at a worksite to power machines, according to examples of the disclosure.

FIG. 2 is a schematic illustration of an example microgrid powerlines 106 deployed at a worksite 200 to power electric machines 202, according to examples of the disclosure. It should be understood that powering machines 202 at a worksite 200 is merely one non-limiting example of use of a microgrid 100. The discussion in conjunction with FIG. 2 does not limit the application of the disclosure to any particular application.

The electric machine 202, as depicted may travel on ground 204, such as along paths on the worksite 200. While the electric machine 202 may have a battery, the electric machine 202 receives power from power facilities at the worksite 200, such as a powerlines 106 of the microgrid 100. It should be understood that in some cases, the worksite 200 may include both electric machines 202, as well as conventional machines (e.g., internal combustion engine machines) or any other type of machine (e.g., battery-only electric machines, hybrid machines, etc.). The powerlines 106 may provide any voltage, current, and/or power to the machine 202.

The electric machine 202 includes a connector 206 that allows the electric machine 202 to be electrically and/or physically connected to the powerlines 106 and derive electrical power therefrom. As the electric machine 202 moves along the ground 204, the connector 206 may receive power along the powerlines 106. The connector 206 may be configured to capture and/or release the powerlines 106 and receive power from those powerlines 106. In the case where the powerlines 106 are discontinuous, the connector 206 may be configured to release and reengage the powerlines 106.

The electric machine 202 is illustrated as a mining truck, which is used, for example, for moving mined materials, heavy construction materials, and/or equipment, and/or for road construction, building construction, other mining, paving and/or construction applications. For example, the electric machine 202 is used in situations where materials, such as mineral ores, loose stone, gravel, soil, sand, concrete, and/or other materials of a worksite need to be transported over the ground 204 at the worksite 200. The electric machine 202, although depicted as a mining truck type of machine, may be any suitable machine, such as any type of loader, dozer, dump truck, skid loader, excavator, backhoe, combine, crane, drilling equipment, trencher, tractor, any suitable stationary machine, any variety of generator, locomotive, marine engines, combinations thereof, or the like. The electric machine 202 is configured for propulsion using electricity, as received via the connector 206.

The electric machine 202 may further be configured to communicate wirelessly, such as via antenna 208. The antenna 208 allows the electric machine 202 to receive and/or send wireless signals 210 from/to a site control center 212. Alternatively, the communications may be performed in a wired manner. The site control center 212 may include any suitable combination of hardware, software, and/or firmware (e.g., a computer) to provide the functionality to communicate with the electric machine 202.

Thus, the microgrid 100 with its powerlines 106 provide power to the worksite 200 to operate electric machine 202 and other similar electric machines 202, power communications between electric machines 202 and the site control center 212, power the operations of the site control center 212, and provide any other power needed at the worksite 200. Because the worksite 200 may be at a relatively remote location without electrical infrastructure, it may be advantageous to build and operate the microgrid 100 at the worksite 200. The worksite 200 may have any variety of generating assets 102, such as solar panels, micro-wind turbines, hydro-turbines, hydrogen fuel cells, diesel generators, gas generators, or the like.

It will also be understood why the controller 116 may periodically recharacterize the parasitic losses from various assets 102 at the worksite 200. As the electric machine 202, as a power consuming load 112, moves along the powerlines 106, the distance, and therefore the resistances and/or the reactances between the electric machine 202 and a fixed location asset 102 may change within the microgrid 100. Thus, as the electric machine 202 moves the estimates of the parasitic losses between the asset 102 and the load 112, in the form of the electric machine 202, may become stale or outdated. As a result, the controller 116 may update its parasitic loss models 122 for individual assets 102. As would be understood, the frequency of recharacterizing the network of the microgrid 100 may be based on the application of the microgrid and the probability of the parasitics between the asset 102 and the load 112 changing.

It should be understood that the example of the microgrid 100 at the worksite 200 is merely an example and is not intended to limit the application of the disclosure herein. Rather the worksite 200 example is to demonstrate many commonalities between different uses of the microgrid 100, such as providing power to different types of loads, such as the electric machine 202 and the site control center 212. The worksite 200 microgrid 100 also demonstrates how a microgrid 100 can be extremely useful for providing electrical power at remote, undeveloped, and/or difficult to reach areas. Indeed, the disclosure contemplates deploying a microgrid 100 anywhere for any purpose and operating the same in the manner disclosed herein.

By operating the microgrid 100 as disclosed herein, the powerlines 106 will be able to dispatch an exact amount of power (e.g., active power and/or reactive power) that fulfills the needs of the loads 112 (e.g., the electric machine 202) and account for losses in the delivery of the dispatched power. For example, if 100 Watts (W) of additional active power is to be provided to site control center 212, and the controller ascertains that there will be 1 W of network losses in delivering the additional 100 W of power, then the controller 116 may dispatch 101 W of active power to fulfill the needs of the site control center 212 and account for the parasitic losses in the delivery of that power. In this way, the controller 116 dispatches the correct amount of power responsive to the needs of the microgrid 100 based on the network characterization performed by the controller 116 at a prior time.

The operating of the microgrid 100 in the fashion described herein allows for more accurate dispatch and fulfillment of power needs, with minimal shortfalls in the delivery of needed power, as well as oversupplying power that is wasted in the form of heating the various components of the microgrid 100. Therefore, the microgrid 100, by the disclosure herein, operates in a more efficient, accurate, and/or precise way, resulting in reduced voltage lags and/or surges, as well as reduced decoherence of the frequency and/or phase of the power transported in the microgrid 100 and/or provided by individual assets 102. In this way, the mechanisms disclosed herein ameliorate issues with microgrids 100 for lack of electrical momentum, which is less common in macrogrids. The operation of microgrids 100 as discussed herein may also improve the operation lifetimes of components of the microgrid 100. Further still, the operations of the microgrid 100, as disclosed herein, may reduce the stresses and/or utilization of the swing machine 104, which may further provide benefits in the lowering the cost of the consumed power in the microgrid 100, as utility-scale power from the swing machine 104 may be more expensive than the power generated by assets 102.

Figure 3:
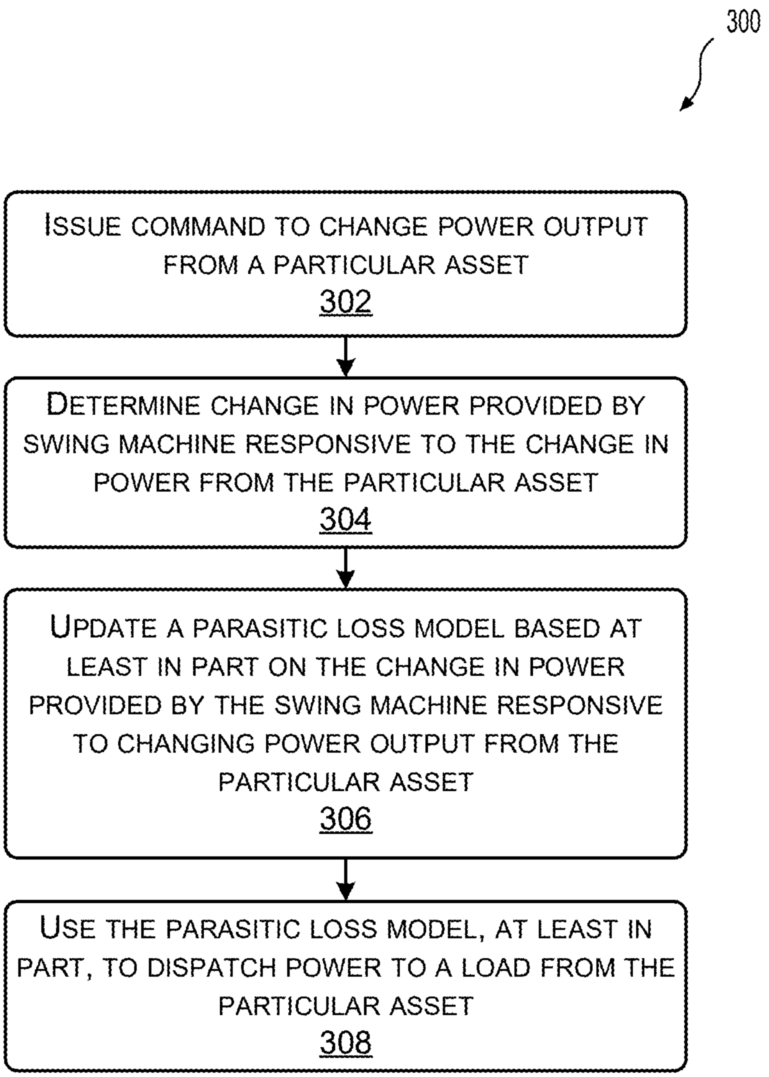
FIG. 3 is a flow diagram depicting an example method for characterizing a generating asset of the microgrid of FIG. 1, according to examples of the disclosure.

FIG. 3 is a flow diagram depicting an example method 300 for characterizing a generating asset 102 of the microgrid 100 of FIG. 1, according to examples of the disclosure. The processes of method 300 may be performed by the controller 116, individually or in conjunction with one or more other elements of the microgrid 100, such as sensors 108. Method 300 allows the controller 116 to more effectively dispatch power the asset 102 to be characterize for more robust microgrid 100 operations. According to examples of the disclosure, method 300 may be performed concurrently during the normal operation of the microgrid 100 and its controller 116.

At block 302, the controller 116 may issue a command to change the power output from a particular asset 102. The command may indicate the power (e.g., apparent power, active power, and/or reactive power) output to which the asset 102 is to change its power output and/or indicate the change in power output to be implemented by the asset 102. The command may be sent to the asset 102 from the controller 116 via the control plane 118.

At block 304, the controller 116 may determine the change in power provided by the swing machine 104 responsive to the change in power from the particular asset 102. This change in power may be communicated to the controller 116 from either the swing machine 104 or the sensor 108(0). The change in power output at the swing machine 104 may be any type of power, such as apparent power, active power, and/or reactive power.

At block 306, the controller 116 may update a parasitic loss model 122 based at least in part on the change in the power provided by the swing machine 104 responsive to changing the power output from the particular asset 102. In some cases, where the parasitic loss model 122 does not already exist, the controller 116 may generate a new parasitic loss model 122 for the particular asset 102. The parasitic loss model 122, although depicted as a three-axis graph, may be any suitable mapping of the parasitic losses expected between the particular asset 102 and the one or more loads 112 at various operating conditions of the particular asset 102. For example, the parasitic loss model may be in the form of a look-up table, a two-axis graph, a mathematical expression, a scatter plot, or the like.

At block 308, the controller 116 may use the parasitic loss model 122, at least in part, to dispatch power to a load 112 from the particular asset 102. The controller 116 may look up the parasitic loss model 122 for the particular asset 102, when the power needs to be dispatched to the microgrid 100 from the particular asset 102. After the controller 116 determines, using the parasitic loss model 122, an estimate of the parasitic losses in delivering the needed power from the particular asset 102 to the one or more loads 112, the controller 116 can command the particular asset 102 to provide the sum of the needed power and the estimated parasitic losses in delivering that needed power to the one or more loads 112. The dispatch from a variety of assets 102 may be varied or at least influenced, based at least in part on the parasitic loss models 122, to optimize for a variety of factors, such as reducing overall parasitic losses, reducing cost of dispatched power, increasing lifetime of assets 102 and/or other components of the microgrid 100, or the like. It should be understood that there may be a variety of other factors that may play a part on the preferential mix and dispatch of power from the various assets 102 of the microgrid. The method 300 may be performed on some or all of the assets 102 of the microgrid 100 and the network-level characterization may be used to provide an optimized mix of power from the various assets 102.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

Figure 4:
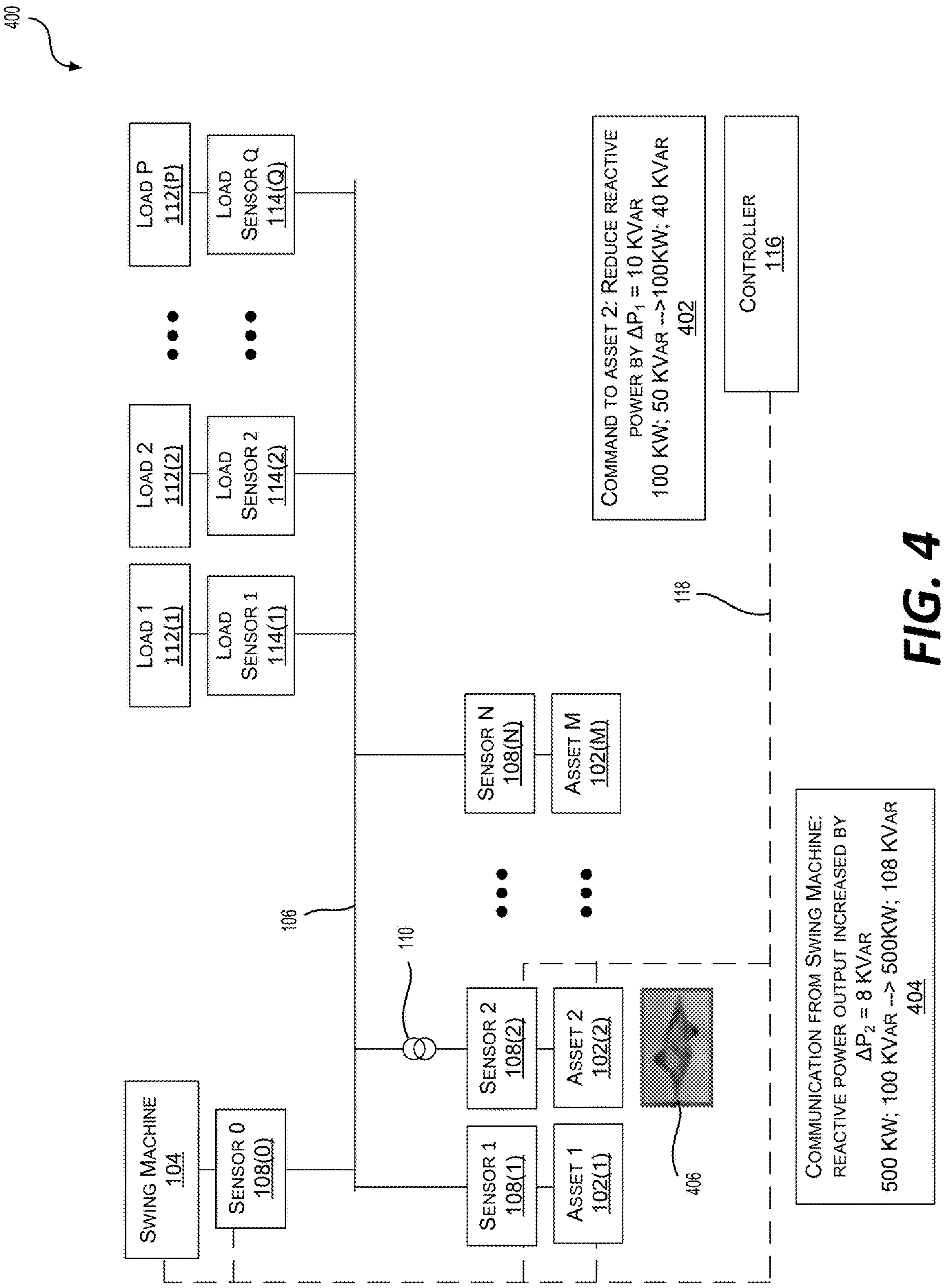
FIG. 4 is a block diagram depicting characterization of a generating asset of the microgrid of FIG. 1, according to examples of the disclosure.

FIG. 4 is a block diagram depicting an environment 400 for characterization of a generating asset 102(2) of the microgrid 100 of FIG. 1, according to examples of the disclosure. As shown, the controller 116 may send a command 402 to the asset 102(2) to reduce its reactive power by 10 kVar. The command 402 may be sent via the control plane 118 as one or more data packet(s). The data packet(s) may include header information to direct the command to the correct destination of the asset 102(2). The command 402 may include information such as what power (e.g., active power and/or reactive power) to provide to the microgrid 100. Alternatively or additionally, the command 402 may indicate by how much (10 kVar) the asset 102(2) is to change its power output ($\Delta P_1$=10 kVar).

The controller 116 may then obtain a communication 404 from the swing machine 104 and/or the sensor 108(0) that indicates that the reactive power output of the swing machine 104 increased by $\Delta P_2$=8 k Var, responsive to the 10 k Var decrease in the power output from the asset 102(2). Again, the communications 404 from the swing machine 104 and/or sensor 108(0) may be in the form of one or more data packet(s) with a header that indicates the intended recipient of the communications 404 as the controller 116.

The controller 116, after commanding $\Delta P_1$ and identifying $\Delta P_2$, may then determine the parasitic loses from the asset 102(2) to the loads 112. These parasitic losses may be used to update a parasitic loss model 406 associated with the asset 102(2). The controller 116 may proceed with other changes in power output ($\Delta P_1$) from the asset 102(2) to more completely map out the parasitic loss responses at different power levels to more completely map and/or update the parasitic loss model 406 of the asset 102(2). The controller 116 may further model the active power response, or parasitic losses associated with changes in active power from asset 102(2) to generate or update an active power parasitic loss model. Similarly, the controller 116 may generate active power parasitic models 122 and/or reactive power parasitic models for the other assets 102 of the microgrid 100. Once individual assets 102 have been characterized by the controller 116, the controller may use that characterization in the future to dispatch active or reactive power from each of the assets 102.

Figure 5:
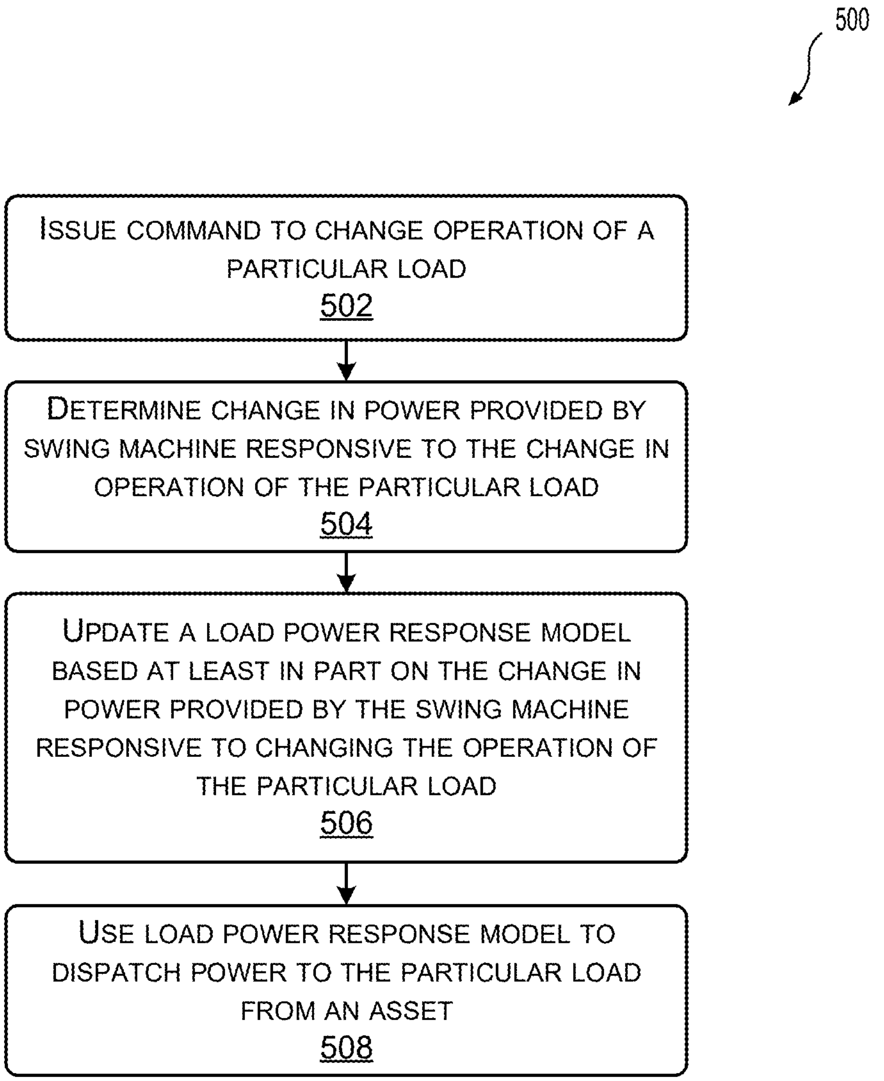
FIG. 5 is a flow diagram depicting an example method for characterizing a load on the microgrid of FIG. 1, according to examples of the disclosure.

FIG. 5 is a flow diagram depicting an example method 500 for characterizing a load 112 on the microgrid of FIG. 1, according to examples of the disclosure. The processes of method 500 may be performed by the controller 116, individually or in conjunction with one or more other elements of the microgrid 100, such as the load sensors 114. Method 500 allows the controller 116 to characterize the parasitic losses associated with delivering power to a particular load 112. This method 500 is optional and may not be used by the controller 116. In other words, the controller 116, in many cases, may only characterize the microgrid 100 from the perspective of the assets 102 and not the loads 112.

At block 502, the controller 116 may issue a command to change the operation of a particular load 112. This change in operation may result in a known change in the voltage, current, and/or power drawn by the load 112 being characterized. The controller 116 may receive an indication of the change in the power drawn by the load ($\Delta P_{L1}$). It should be understand that in some cases, the load may be completely turned off or on by way of the command form the controller 116. The load 112 may be commanded by way of the control plane 120 between the controller 116 and the particular load 112.

At block 504, the controller 116 may determine the change in power ($\Delta P_{L2}$) provided by the swing machine 104 responsive to the change in operation of the particular load 112. By comparing the change in power consumed by the load 112 ($\Delta P_{L1}$) to the change in power provided to the load 112 ($\Delta P_{L2}$), the controller 116 can determine the parasitic losses involved in the delivery of power to that particular load 112. The controller 116 may receive an indication of the change on power provided by the swing machine 104 from the swing machine 104 and/or the sensor 108(0) via the control plane 118.

At block 506, the controller 116 may generate or update a load power response model based at least on the change in the power provided by the swing machine 104 responsive to the change in the operation of the particular load. At block 508, the controller 116 uses the power response model of the load 112 to dispatch power to the particular load from an asset 102 of the microgrid 100. The dispatch of power may include the power needs of the particular load 112 along with any parasitic losses associated with delivering power to the particular load 112. Furthermore, the shedding and/or adding the loads 112 may be made, at least in part, on the estimates of the losses, as determined by the disclosure herein.

It should be understood that the method 500 may be repeated with different changes in power consumed by the particular load 112 to more fully characterize the parasitic losses associated with delivering power to the particular load 112. By performing method 500 with different changes in the operation of the particular load 112, the load power response model associated with the load may be more completely generated and/or updated. The controller 116 may also repeat the method 500 for various other loads 112 of the microgrid 100 to have an indication of the parasitic losses associated with delivering power to the various loads 112.

It should be noted that some of the operations of method 500 may be performed out of the order presented, with additional elements, and/or without some elements. Some of the operations of method 500 may further take place substantially concurrently and, therefore, may conclude in an order different from the order of operations shown above.

Figure 6:
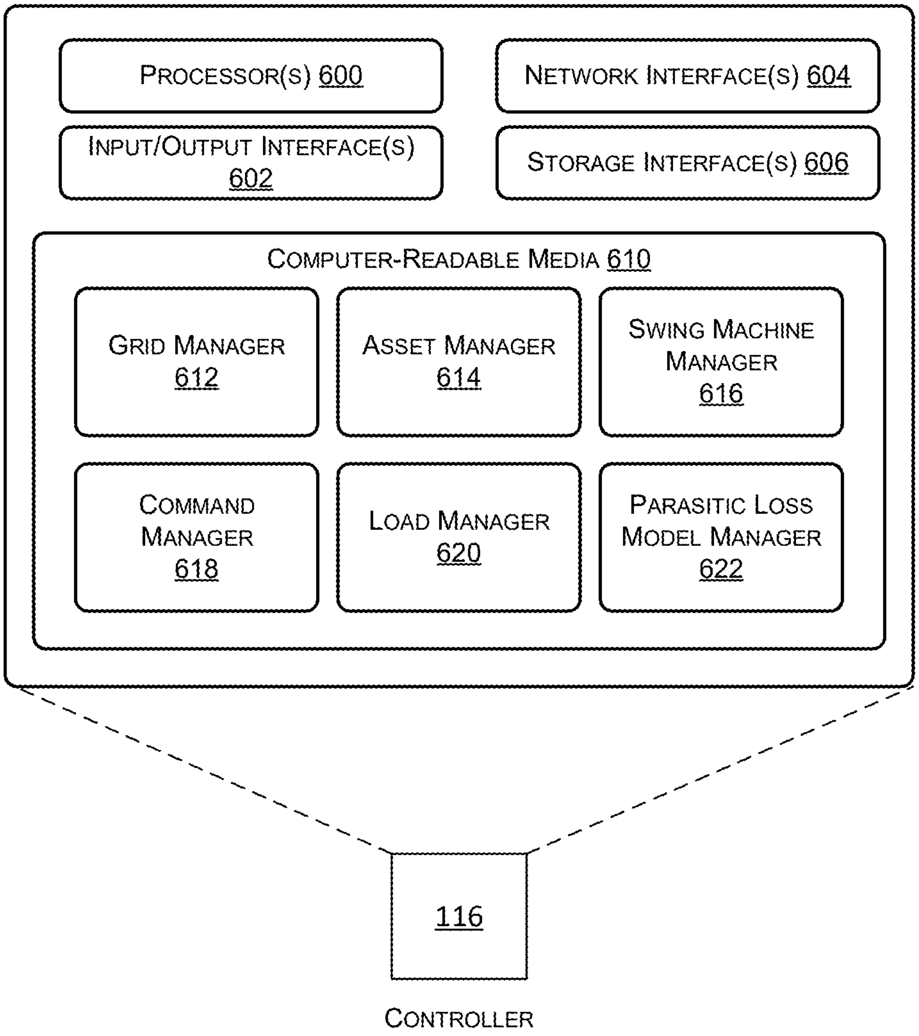
FIG. 6 is a block diagram of a controller of the microgrid of FIG. 1, according to examples of the disclosure.

FIG. 6 is a block diagram of a controller 116 of the microgrid 100 of FIG. 1, according to examples of the disclosure. The controller 116 includes one or more processor(s) 600, one or more input/output (I/O) interface(s) 602, one or more communication interface(s) 604, one or more storage interface(s) 606, and computer-readable media 610. In examples, the processor(s) 600, I/O interfaces 602, communications interface(s) 604, storage interface(s) 606, and/or computer-readable memory 610 may be part of an electronic device or computer system.

In some implementations, the processors(s) 600 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 600 may possess its own local memory, which also may store program modules, program data, and/or one or more operating systems. The one or more processor(s) 600 may include one or more cores.

The one or more input/output (I/O) interface(s) 602 may enable the controller 116 to detect interaction with a human operator. For example, the operator may provide task instructions (e.g., dispatch power) or monitor metrics (e.g., voltage lag, frequency, etc.) of the power delivered via the microgrid 100.

The network interface(s) 604 may enable the controller 116 to communicate via the one or more network(s). The network interface(s) 604 may include a combination of hardware, software, and/or firmware and may include software drivers for enabling any variety of protocol-based communications, and any variety of wireline and/or wireless ports/antennas. For example, the network interface(s) 604 may comprise one or more of WiFi, cellular radio, a wireless (e.g., IEEE 802.1x-based) interface, a Bluetooth® interface, and the like. Thus, the network interface(s) 604 may enable one or both of the control planes 118, 120.

The storage interface(s) 606 may enable the processor(s) 600 to interface and exchange data with the computer-readable medium 610, as well as any storage device(s) external to the controller 116. The storage interface(s) 606 may further enable access to removable media.

The computer-readable media 610 may include volatile and/or nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 610 may be implemented as computer-readable storage media (CRSM), which may be any available physical media accessible by the processor(s) 600 to execute instructions stored on the memory 610. In one basic implementation, CRSM may include random access memory (RAM) and Flash memory. In other implementations, CRSM may include, but is not limited to, read-only memory (ROM), electrically erasable programmable read-only memory (EEPROM), or any other tangible medium which can be used to store the desired information, and which can be accessed by the processor(s) 600. The computer-readable media 610 may have an operating system (OS) and/or a variety of suitable applications stored thereon. The OS, when executed by the processor(s) 600 may enable management of hardware and/or software resources of the controller 116.

Several components such as instruction, data stores, and so forth may be stored within the computer-readable media 610 and configured to execute on the processor(s) 600. The computer readable media 610 may have stored thereon a grid manager 612, an asset manager 614, a swing machine manager 616, a command manager 618, a load manager 620, and a parasitic loss model manager 622. It will be appreciated that each of the components 612, 614, 616, 618, 620, 622 may have instructions stored thereon that when executed by the processor(s) 600 may enable various functions pertaining to operating the controller 116, as described herein.

The instructions stored in the grid manager 612, when executed by the processor(s) 600, may configure the controller 116 to manage the elements of the microgrid 100, such as the assets 102 and the sensors 108. In some cases, the controller 116 may further optionally control the loads 112 and/or the load sensors 114. The instructions stored in the asset manager 614, when executed by the processor(s) 600, may configure the controller 116 to manage operations of the assets 102. The processor(s) 600 may further instruct a change in the power dispatched from individual ones of the assets 102.

The instructions stored in the swing machine manager 616, when executed by the processor(s) 600, may configure the controller 116 to manage communications and monitoring of the swing machine 104. The instructions stored in the command manager 618, when executed by the processor(s) 600, may configure the controller 116 to generate commands, such as to change the amount of power to be dispatched from an asset 102, and send those commands. The instructions stored in the load manager 620, when executed by the processor(s) 600, may configure the controller 116 to control operations of the loads 112, such as the amount of power the load 112 draws. The instructions stored in the parasitic loss model manager 622, when executed by the processor(s) 600, may configure the controller 116 to generate and use the parasitic loss model(s) 122 generated for individual ones of the assets 102. As stated herein, the functionality of one or more components 612, 614, 616, 618, 620, 622 may be combined or separated, according to the disclosure herein.

The disclosure is described above with reference to block and flow diagrams of systems, methods, apparatuses, and/or computer program products according to the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented or may not necessarily need to be performed at all, according to some examples of the disclosure.

Computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other cases, the databases shown can be integrated or distributed into any number of databases or other data storage devices.

INDUSTRIAL APPLICABILITY

The present disclosure describes apparatus, systems, and methods for characterizing a microgrid network for improved dispatch of power from one or more generation assets 102 of the microgrid 100. The controller 116 of the microgrid may implement a series of changes in the power output of an asset 102 ($\Delta P_1$) and observe the resultant change in power provided by the swing machine 104 ($\Delta P_2$). The comparison of $\Delta P_1$ and $\Delta P_2$ allows the controller 116 to ascertain the level parasitic losses from the asset 102 to the loads 112 being supplied with power. The controller 116 may generate a parasitic loss model of the asset 102, which can be used in the future to dispatch power from the asset 102 in a manner that accounts for the parasitic losses in delivering the power from the asset to the loads 112. In other words, the controller 116, by knowing the magnitude of parasitic losses expected from the asset 102 delivering power to the microgrid 100, the controller 116 is able to command the asset 102 to provide sufficient power to the microgrid 100 for the power needed by the loads 112 and also to compensate for the parasitic losses in transmission of that power. The controller 116 can also perform better load distribution across assets 102 to optimize a variety of factors, including component lifetimes, efficiency, cost, etc.

Although microgrids 100 are advantageous in providing power in remote locations without established power infrastructure or from a diversity of power sources, the microgrids 100 lack the large amount of electrical inertia that macrogrids, such as utility grids, provide. For example, it may be more difficult to provide a high quality of power in a microgrid 100. Because of these and other challenges, microgrids may experience more voltage lags and voltage spikes, as well as reduced coherence in its frequency and/or phase of operation.

By commanding a more accurate and precise dispatch of power from individual assets 102 of the microgrid 100, as disclosed here, the controller 116 can better match the power supply to the power needs in the microgrid 100 compared to conventional mechanisms. Thus, the controller 116 can avoid providing too little or too much power to the microgrid 100 from the assets 102. By better matching the power needs with the power supply in the microgrid 100, higher quality power is provided to the loads 112. The higher quality power delivery may involve fewer voltage surges or voltage lags. Additionally, the better matching of power supply and consumption may provide for reduced frequency and/or phase mismatches in the microgrid 100. By better matching power demand and supply, taking into account the parasitic losses in delivering the power, enables all of the loads 112 to get the power they need for desired performance without excessive thermal losses in the microgrid 100. The better power matching may also lead to longer usable lifetimes of the various components of the microgrid 100, as those components dissipate less waste power.

Although the apparatus, systems, and methods of microgrid 100 are discussed in the context of a mining trucks and other machinery 202 at a worksite 200, it should be appreciated that the systems and methods discussed herein may be applied to a wide array of different microgrids 100 across a wide variety of industries, such as civilian, residential, cooperatives, construction, mining, farming, transportation, combinations thereof, or the like. For example, the microgrid 100 characterization and control mechanism disclosed herein may be applied to a microgrid setup at a disaster area to provide power for disaster relief.

While aspects of the present disclosure have been particularly shown and described with reference to the examples above, it will be understood by those skilled in the art that various additional examples may be contemplated by the modification of the disclosed machines, systems and methods without departing from the spirit and scope of what is disclosed. Such examples should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A microgrid, comprising:

one or more generating asset, including a first generating asset;

a swing machine;

one or more loads;

a controller; and one or more computer-readable media storing computer-executable instructions that, when executed by the controller, cause the controller to:

send a first command to the first generating asset to implement a first power output change from the first generating asset;

determine a second power output change from the swing machine, wherein the second power output change is responsive to the first power output change;

compare the first power output change to the second power output change to identify parasitic losses in delivering power from the first generating asset to the one or more loads; and send a second command, to the first generating asset, to dispatch power from the first generating asset based at least in part on the parasitic losses in delivering power from the first generating asset to the one or more loads.

2. The microgrid of claim 1, wherein the computer-executable instructions, when executed by the controller, further cause the controller to:

generate, based at least in part on the parasitic losses in delivering power from the first generating asset to the one or more loads, a parasitic loss model of the first generating asset.

3. The microgrid of claim 2, wherein the second command is based at least in part on the parasitic loss model of the first generating asset.

4. The microgrid of claim 1, wherein the second command to dispatch power from the first generating asset indicates a quantity of power to be dispatched, wherein the quantity of power to be dispatched includes power needs of the one or more loads and expected losses in delivering power from the first generating asset to the one or more loads.

5. The microgrid of claim 1, wherein the computer-executable instructions, when executed by the controller, further cause the controller to:

send a third command to a second generating asset to implement a third power output change from the second generating asset;

determine a fourth power output change from the swing machine, wherein the fourth power output change is responsive to the third power output change;

compare the third power output change to the fourth power output change to identify second parasitic losses in delivering power from the second generating asset to the one or more loads; and generate, based at least in part on the second parasitic losses in delivering power from the second generating asset to the one or more loads, a second parasitic loss model of the second generating asset.

6. The microgrid of claim 5, wherein the computer-executable instructions, when executed by the controller, further cause the controller to:

send a third command, to the second generating asset, to dispatch second power from the second generating asset based at least in part on the second parasitic loss model of the second generating asset.

7. The microgrid of claim 5, wherein the second parasitic loss model is generated at a first time, and the computer-executable instructions, when executed by the controller, further cause the controller to:

send a fifth command to the second generating asset to implement a fifth power output change from the second generating asset;

determine a sixth power output change from the swing machine, wherein the sixth power output change is responsive to the fifth power output change; and update, at a second time after the first time and based at least in part on the fifth power output change and the sixth power output change, the second parasitic loss model of the second generating asset.

8. The microgrid of claim 1, wherein the swing machine comprises a grid tie to a utility power grid.

9. The microgrid of claim 1, wherein the one or more loads comprises an electric machine at a worksite.

10. A method, comprising:

sending, by a controller comprising one or more processors, a first command to a first generating asset to implement a first power output change from the first generating asset;

receiving, by the controller, an indication of a second power output change from a swing machine, wherein the second power output change is responsive to the first power output change;

comparing, by the controller, the first power output change to the second power output change to identify parasitic losses in delivering power from the first generating asset to one or more loads; and generating, by the controller and based at least in part on the parasitic losses in delivering power from the first generating asset to the one or more loads, a parasitic loss model of the first generating asset.

11. The method of claim 10, further comprising:

sending, by the controller, a second command, to the first generating asset, to dispatch power from the first generating asset based at least in part on the parasitic losses in delivering power from the first generating asset to the one or more loads.

12. The method of claim 11, wherein the second command to dispatch power from the first generating asset indicates a quantity of power to be dispatched, wherein the quantity of power to be dispatched includes power needs of the one or more loads and expected losses in delivering power from the first generating asset to the one or more loads.

13. The method of claim 10, further comprising:

sending, by the controller, a second command to the first generating asset to implement a third power output change from the first generating asset;

receiving, by the controller, an indication of a fourth power output change from the swing machine, wherein the fourth power output change is responsive to the first power output change; and updating, by the controller and based at least in part on the third power output change and the fourth power output change, the parasitic loss model of the first generating asset.

14. The method of claim 10, further comprising:

sending, by the controller, a second command to a second generating asset to implement a third power output change from the second generating asset;

determining, by the controller, a fourth power output change from the swing machine, wherein the fourth power output change is responsive to the third power output change;

comparing, by the controller, the third power output change to the fourth power output change to identify second parasitic losses in delivering power from the second generating asset to the one or more loads; and sending, by the controller, a third command to the second generating asset, to dispatch power from the second generating asset based at least in part on the second parasitic losses in delivering power from the second generating asset to the one or more loads.

15. The method of claim 14, further comprising:

generating, by the controller and based at least in part on the second parasitic losses in delivering power from the second generating asset to the one or more loads, a second parasitic loss model of the second generating asset.

16. The method of claim 10, wherein receiving the indication of the second power output change comprises receiving the indication of the second power output change from a sensor associated with the swing machine.

17. A microgrid controller, comprising:

one or more processors;

one or more computer-readable media storing computer-executable instructions that, when executed by the one or more processors, cause the one or more processors to:

receive, from a sensor, an indication in a first change in power delivered from a swing machine to one or more loads of a microgrid, wherein the first change in power is responsive to a second change in power from a first generating asset;

determine, based at least in part on the first change in power and the second change in power, an estimate of parasitic losses associated with delivering power from the first generating asset to one or more loads; and send, based at least in part on the estimate of the parasitic losses associated with delivering power from the first generating asset to the one or more loads, a command to the first generating asset to provide power the one or more loads.

18. The microgrid controller of claim 17, wherein the computer-executable instructions, when executed by the one or more processors, cause the one or more processors to:

generate, based at least in part on the estimate of the parasitic losses associated with delivering power from the first generating asset to the one or more loads, a parasitic loss model for the first generating asset.

19. The microgrid controller of claim 18, wherein the parasitic loss model is associated with reactive power delivered from the first generating asset.

20. The microgrid controller of claim 17, wherein the computer-executable instructions, when executed by the one or more processors, cause the one or more processors to:

receive, from a second sensor, a second indication in a third change in power delivered from a swing machine to one or more loads of a microgrid, wherein the third change in power is responsive to a fourth change in power from a second generating asset;

determine, based at least in part on the third change in power and the fourth change in power, a second estimate of parasitic losses associated with delivering power from the second generating asset to one or more loads; and send, based at least in part on the second estimate of the parasitic losses associated with delivering power from the second generating asset to the one or more loads, a second command to the second generating asset to provide power the one or more loads.

* * * * *